United States Patent
Honda et al.

(10) Patent No.: US 10,085,325 B2
(45) Date of Patent: Sep. 25, 2018

(54) RADIO WAVE SENSOR AND LUMINAIRE

(71) Applicant: PANASONIC INTELLECTUAL PROPERTY MANAGEMENT CO., LTD., Osaka (JP)

(72) Inventors: Yoshiaki Honda, Kyoto (JP); Takeshi Ohno, Osaka (JP); Yasuko Yamamoto, Osaka (JP); Takaaki Ukeda, Osaka (JP); Shigeo Gotoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/804,309

(22) Filed: Nov. 6, 2017

(65) Prior Publication Data

US 2018/0132337 A1 May 10, 2018

(30) Foreign Application Priority Data

Nov. 7, 2016 (JP) .................................. 2016-217358

(51) Int. Cl.
*H01Q 1/12* (2006.01)
*H05B 37/02* (2006.01)
*H01Q 1/52* (2006.01)
*H01Q 19/06* (2006.01)
*G01S 13/56* (2006.01)
*G01S 7/02* (2006.01)
*H01Q 1/42* (2006.01)

(52) U.S. Cl.
CPC ........... *H05B 37/0227* (2013.01); *H01Q 1/12* (2013.01); *H01Q 1/525* (2013.01); *H01Q 19/06* (2013.01); *G01S 13/56* (2013.01); *G01S 2007/027* (2013.01); *H01Q 1/42* (2013.01)

(58) Field of Classification Search
CPC .......... H01Q 1/12; H01Q 1/525; H01Q 19/06; H05B 37/0227
USPC ............................... 307/106, 145; 343/700 R
See application file for complete search history.

(56) References Cited

U.S. PATENT DOCUMENTS

| | | | |
|---|---|---|---|
| 2006/0025897 A1* | 2/2006 | Shostak | B60C 23/005 701/1 |
| 2006/0167595 A1* | 7/2006 | Breed | B60R 21/01536 701/1 |
| 2009/0189617 A1* | 7/2009 | Burns | E21B 43/24 324/649 |

(Continued)

FOREIGN PATENT DOCUMENTS

JP 2007-104027 4/2007

*Primary Examiner* — Douglas W Owens
*Assistant Examiner* — Syed M Kaiser
(74) *Attorney, Agent, or Firm* — Greenblum & Bernstein, P.L.C.

(57) ABSTRACT

A radio wave sensor includes a transmitting antenna configured to radiate radio waves, a receiving antenna configured to receive incoming radio waves, and a housing that is composed of dielectric material and faces the transmitting and receiving antennas. The housing has a first part that faces the transmitting antenna, a second part that faces the receiving antenna, and a third part between the first and second parts. In a facing direction in which a bottom board of the housing faces the transmitting and receiving antennas, respective thickness of the first and second parts is thicker than thickness of the third part.

14 Claims, 3 Drawing Sheets

(56) References Cited

U.S. PATENT DOCUMENTS

| | | | |
|---|---|---|---|
| 2010/0297952 A1* | 11/2010 | Rofougaran | H01Q 21/061 455/73 |
| 2011/0080328 A1* | 4/2011 | Fehr | H01Q 9/40 343/720 |
| 2016/0197403 A1* | 7/2016 | Choi | H01Q 1/243 343/700 MS |
| 2017/0187124 A1* | 6/2017 | Kirino | H01Q 13/20 |
| 2017/0194716 A1* | 7/2017 | Kirino | H01Q 21/064 |
| 2017/0237177 A1* | 8/2017 | Kirino | H01Q 13/24 343/745 |

* cited by examiner

RADIO WAVE SENSOR AND LUMINAIRE

CROSS REFERENCE TO RELATED APPLICATION

This application claims the benefit and priority of Japanese Patent Application No. 2016-217358, filed on Nov. 7, 2016, the entire contents of which is incorporated herein by reference.

TECHNICAL FIELD

The disclosure relates to radio wave sensors and luminaires and, more particularly, to a radio wave sensor for detecting, e.g., human presence, which has a transmitting antenna configured to radiate radio waves and a receiving antenna configured to receive incoming radio waves, and a luminaire including the radio wave sensor.

BACKGROUND ART

In a related radio wave sensor (high frequency sensor), it has been known to use radio waves as one of wireless media (for example, JP 2007-104027 A (hereinafter referred to as "Document 1")). The radio wave sensor described in Document 1 includes a transmitting antenna and a receiving antenna that are mounted on a substrate with a space between them, and a housing (dielectric lens) that is disposed forward of the transmitting and receiving antennae (antennas) so as to cover the transmitting and receiving antennae.

The radio wave sensor described in Document 1 is configured to detect the presence of an object when the receiving antenna receives radio waves (reflected waves) that have been transmitted from the transmitting antenna to reflected by the object.

Here, with the radio wave sensor described in Document 1, there is a possibility that errors in detection will occur because part of the radio waves from the transmitting antenna may directly enter the receiving antenna depending on the strength of the electric field coupling between the transmitting and receiving antennae.

SUMMARY OF THE INVENTION

The present disclosure has been achieved in view of the above circumstances, and an object thereof is to provide a radio wave sensor and a luminaire, capable of suppressing the occurrence of errors in detection.

A radio wave sensor according to an aspect of the present disclosure includes a transmitting antenna configured to radiate radio waves, a receiving antenna configured to receive incoming radio waves, and a housing that is composed of dielectric material and faces the transmitting and receiving antennas. The housing has a first part that faces the transmitting antenna, a second part that faces receiving antenna, and a third part between the first and second parts. In a facing direction in which a base of the housing faces the transmitting and receiving antennas, respective thickness of the first and second parts are thicker than thickness of the third part.

A luminaire according to an aspect of the present disclosure includes the radio wave sensor and a luminaire body that retains the radio wave sensor.

BRIEF DESCRIPTION OF THE DRAWINGS

The figures depict one or more implementations in accordance with the present teaching, by way of example only, not by way of limitation. In the figures, like reference numerals refer to the same or similar elements where.

DETAILED DESCRIPTION

A luminaire 10 according to the present embodiment is, for example a luminaire located on a wall of a landing of a set of stairs in a building (what is called a stair light). The directions of a radio wave sensor 1 and the luminaire 10 are defined by up, down, left, right, forward (fore) and backward (aft) shown by arrows in FIG. 1, unless otherwise specifically noted in the explanation below. That is, as seen from the front of the luminaire 10 with the luminaire 10 installed on the wall of the landing, a vertical direction corresponds to the up-and-down direction, a lateral direction corresponds to the left-and-right direction, and a direction normal to the wall corresponds to the fore-and-aft direction. The directions are not intended to limit respective usage types of the radio wave sensor 1 and the luminaire 10. The arrows shown in FIG. 1 are merely depicted in order to supplement the description, and do not exist as their respective entities.

Figure 1:
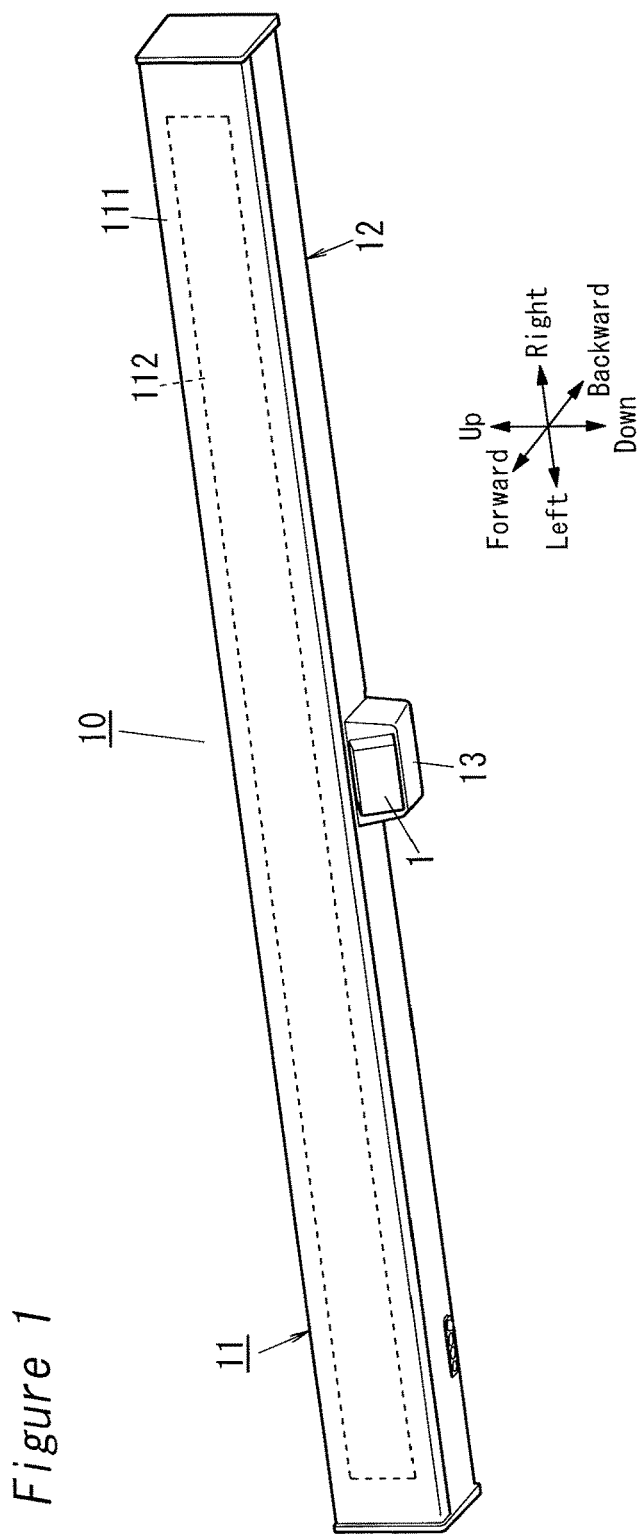
FIG. 1 is a perspective view of a radio wave sensor and a luminaire, in accordance with an embodiment of the present disclosure.

In the example of FIG. 1, the luminaire 10 according to the present embodiment includes a light source device 11, a luminaire body 12 and the radio wave sensor 1.

The light source device 11 includes a cover 111 and a light source 112.

For example, the cover 111 has a box shape having an opening in a back surface thereof, and is made from synthetic resin having translucency (such as polycarbonate resin or acrylic resin). The cover 111 may be elongated in the left-and-right direction.

The light source 112 has, for example a mounting substrate that is flat and elongated in the left-and-right direction. LEDs (Light Emitting Diodes) may be mounted on one surface (front surface) of the mounting substrate at regular intervals along the left-and-right direction (lengthwise direction of mounting substrate).

For example, the cover 111 and the light source 112 are attached to a mounting member, and attached to the luminaire body 12 through the mounting member. The mounting member may be composed of a base plate that is flat and elongated in the left-and-right direction, and two side plates that protrude backward from both ends of the base plate in a width direction thereof (up-and-down direction) so as to have a U shape as seen from the left-and-right direction. For example, the light source 112 is attached on one surface (front surface) of the base plate of the mounting member. The cover 111 is preferably attached to the mounting member to cover the light source 112. A control device 9 and a power supply device may be further attached to the mounting member.

The control device 9 is activated by electric power from a power supply, and configured to turn the light source 112 on and off according to a detection signal (to be described later) from the radio wave sensor 1. For example, when receiving the detection signal from the radio wave sensor 1, the control device 9 provides the power supply device with a control signal that forces the light source 112 to turn on, thereby lighting the light source 112. It is also preferable that when the radio wave sensor 1 stops sending out the detection signal and then a holding time (e.g., several ten seconds) elapses, the control device 9 provide the power supply device with a control signal that forces the light source 112 to turn off or dim, thereby forcing the light source 112 to turn off or dim. Here, "turn on" means that the light source 112 is lit at the light output level of 100%, "turn off" means that the light source 112 is unlit, and "dim" means that the light source 112 is lit at a light output level from more than 0% to less than 100%.

For example, the power supply device is configured to convert AC power from the power supply into DC power to supply the DC power to the light source 112. It is also preferable that the power supply device be configured to increase and decrease the DC power to be supplied to the light source 112 according to a control signal from the control device 9. For example, when receiving the control signal, which forces the light source 112 to turn on, from the control device 9, the power supply device supplies the light source 112 with DC power for turning on the light source 112. In addition, for example, when receiving the control signal, which forces the light source 112 to turn off, from the control device 9, the power supply device stops supplying the DC power to the light source 112.

The luminaire body 12 is, for example, formed by bending a metal plate, and has an elongated box shape having an opening in the front surface thereof. The luminaire body 12 may have a back plate that is flat and elongated in the left-and-right direction, an upper plate and a lower plate that protrude forward from both ends of the back plate in a width direction (widthwise direction) thereof, and a left side-plate and a right side-plate that protrude forward from both ends of the back plate in a lengthwise direction thereof. The back plate of the luminaire body 12 is preferably provided with holes along the left-and-right direction. For example, the luminaire body 12 is fixed on the wall of the landing by inserting anchor bolts protruding from the wall of the landing into respective corresponding holes and then tightening nuts on the anchor bolts.

The radio wave sensor 1 is configured to detect the presence (specifically, movement) of an object (person) by transmitting and receiving, for example radio waves in a millimeter wave band as one of wireless media. In the embodiment, the radio wave sensor 1 preferably detects the movement of an object by transmitting and receiving radio waves having the frequency of 24 [GHz]. In the embodiment, examples of the object to be detected with the radio wave sensor 1 include a door(s) provided on the landing(s), and those who open the door(s) and then enter and exit the landing(s) (a person(s)).

Preferably, the radio wave sensor 1 in the present embodiment is a Doppler radio wave sensor that utilizes the Doppler effect, and configured to detect the movement of an object based on the difference between the frequency of radio waves (transmission waves) transmitted from a transmitting antenna 2 to be described later and the frequency of radio waves (reflected waves) received with a receiving antenna 3 to be described later. For example, the radio wave sensor 1 is attached to the center of the lower plate of the luminaire body 12 in the left-and-right direction through a sensor mounting base 13 as shown in FIG. 1. In other words, the luminaire body 12 may be configured to retain the radio wave sensor 1 through the sensor mounting base 13.

Figure 2:
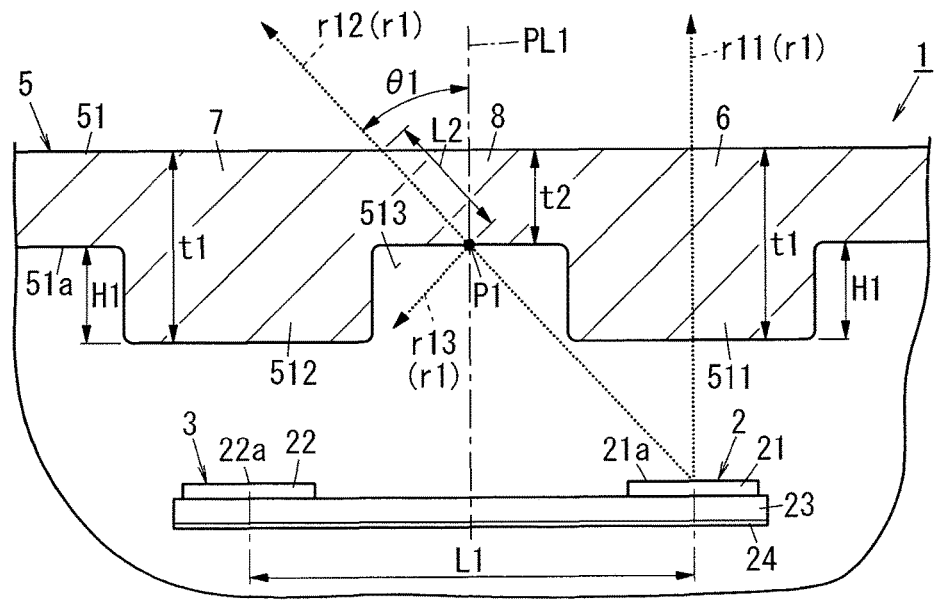
FIG. 2 is a sectional view of part of the radio wave sensor.
Figure 3:
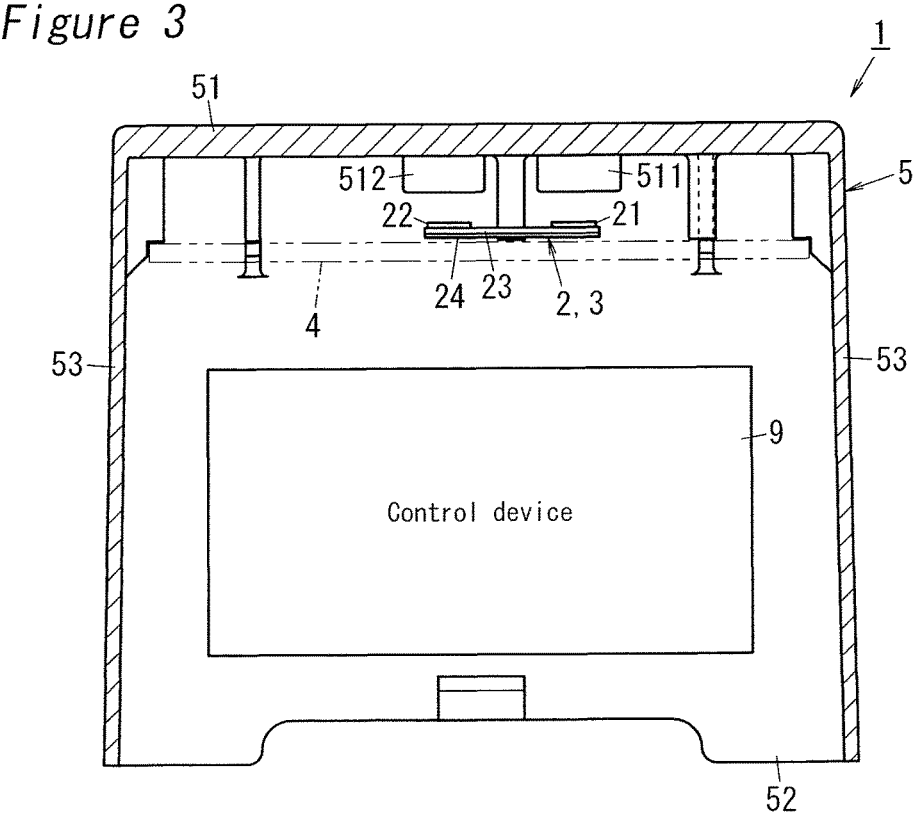
FIG. 3 is a sectional view of the radio wave sensor.
Figure 4:
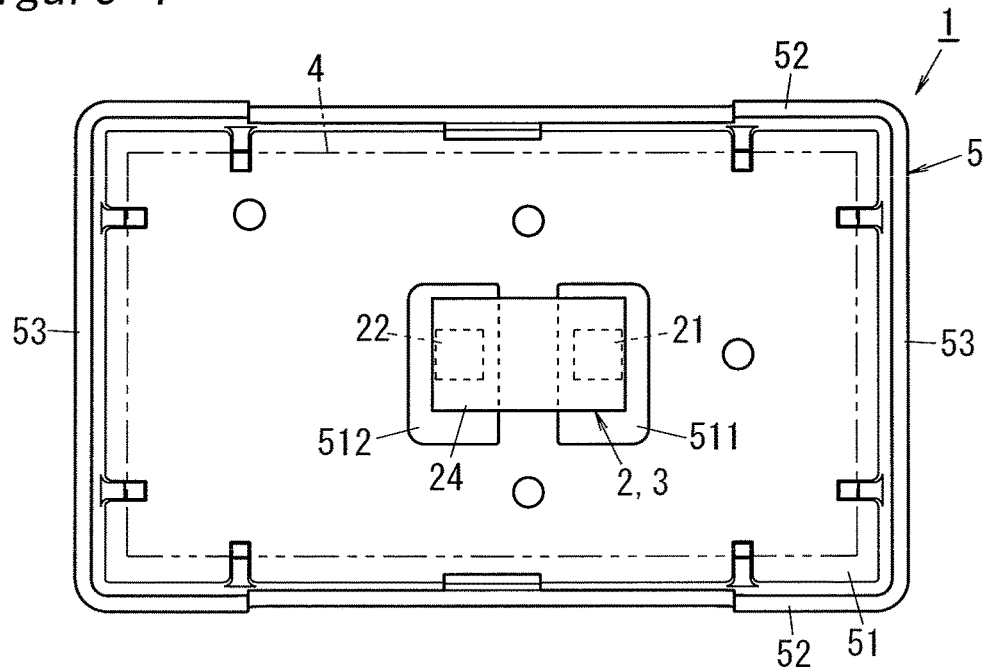
FIG. 4 is a schematic diagram of the radio wave sensor as seen from an opening side of a housing of the radio wave sensor.

As shown in FIGS. 2 to 4, the radio wave sensor 1 preferably includes the transmitting antenna 2, the receiving antenna 3, a control board 4 and a housing 5.

The radio wave sensor 1 in the present embodiment includes, but not limited to, a transmitting and receiving antenna that constitute the transmitting antenna 2 and the receiving antenna 3. As a specific example, the transmitting and receiving antennae (antennas) 2 and 3 have a common configuration except for their respective radiation elements 21 and 22. The transmitting antenna 2 is, for example, a microstrip antenna and includes the radiation element 21, a dielectric substrate 23 and a ground conductor 24. The receiving antenna 3 is, for example, a microstrip antenna, and includes the radiation element 22, the dielectric substrate 23 and the ground conductor 24. That is, in the present embodiment, the radiation element 21 as part of the transmitting antenna 2 and the radiation element 22 as part of the receiving antenna 3 are arranged (formed) on the same dielectric substrate 23. The radiation elements 21 and 22 may certainly be arranged on their respective discrete dielectric substrates.

The dielectric substrate 23 is, for example, flat and elongated in the left-and-right direction and is composed of a dielectric (dielectric material) having a relatively low relative dielectric constant such as epoxy resin.

Preferably, the radiation elements 21 and 22 form plus conductors of the transmitting and receiving antennae 2 and 3, and are square in shape and made from electrically conductive material such as copper foil. For example, the radiation elements 21 and 22 are arranged (formed) a distance L1 (see FIG. 2) apart side by side on a first surface (front surface) of the dielectric substrate 23 along a lengthwise direction (left-and-right direction) of the dielectric substrate 23.

Preferably, the ground conductor 24 forms a minus conductor of each of the transmitting and receiving antennae 2 and 3 and is flat and elongated in the left-and-right direction and made of electrically conductive material such as copper foil. For example, the ground conductor 24 has almost the same shape as the dielectric substrate 23, and is arranged (formed) on a second surface (back surface) of the dielectric substrate 23.

The control board 4 preferably has functions as an oscillator configured to provide an oscillation signal to the transmitting antenna 2, and a detector configured to detect the movement of an object based on radio waves r1 received through the receiving antenna 3. The detector may produce a signal (hereinafter referred to as a "mixer output signal") by mixing (multiplying) the oscillation signal derived from the oscillator and a received signal derived from the receiving antenna 3, and detect the movement of the object based on the mixer output signal. In the present embodiment, since the radio wave sensor 1 is the Doppler radio wave sensor, when a moving object exists in a detection area of the radio wave sensor 1, the frequency of the received signal derived from the receiving antenna 3 shifts by a frequency according to a moving speed of the object from the frequency of the radio waves r1 by the Doppler effect. Thus, when the object is moving, the mixer output signal in the detector is a signal having a frequency that is a difference between the frequency of the radio waves r1 and the frequency of the received signal (i.e., Doppler signal). The detector is preferably configured to compare a signal level of the mixer output signal with a threshold and provide the control device 9 with a signal representing the detection of the movement of the object (detection signal) when the signal level of the mixer output signal exceeds the threshold.

For example, the transmitting and receiving antennae 2 and 3 and the control board 4 are housed in the housing 5 that has a box shape and an opening in a first surface (back surface) thereof as shown in FIGS. 3 and 4.

The housing 5 is composed of, for example a dielectric having a relatively low relative dielectric constant such as ABS (Acrylonitrile Butadiene Styrene) resin, and has a box shape having an opening in a back surface thereof. The housing 5 may have a bottom board (base) 51 that is flat and elongated in the left-and-right direction, two first side boards 52 that protrude backward from both ends of the bottom board 51 in a width direction (widthwise direction) thereof, and two second side boards 53 that protrude backward from both ends of the bottom board 51 in a lengthwise direction thereof.

Preferably, the housing 5 is integrally formed with a first protrusion 511 and a second protrusion 512 that protrude backward from a back surface (facing surface that faces transmitting and receiving antennae 2 and 3) of the bottom board 51. In the example of FIG. 4, the first and second protrusions 511 and 512 are rectangular in a plan view. The first protrusion 511 preferably faces the radiation element 21 as part of the transmitting antenna 2 in the fore-and-aft direction (facing direction in which housing 5 (bottom board 51) faces transmitting antenna 2, i.e., facing direction) with the transmitting and receiving antennae 2 and 3 and the control board 4 housed in the housing 5, as shown in FIGS. 2 to 4. Preferably, the second protrusion 512 also faces the radiation element 22 as part of the receiving antenna 3 in the fore-and-aft direction with the transmitting and receiving antennae 2 and 3 and the control board 4 housed in the housing 5.

Here, in the related radio wave sensor as stated above, an incidence surface of the dielectric lens is a flat surface, and an interval of the dielectric lens from the transmitting and receiving antennae is relatively wide. Errors in detection may accordingly occur because the electric field coupling between the transmitting antenna and the dielectric lens as well as the electric field coupling between the receiving antenna and the dielectric lens are weakened and part of the radio waves from the transmitting antenna directly enters the receiving antenna.

Note that part of radio waves from a transmitting antenna in a Doppler radio wave sensor like the radio wave sensor 1 of the embodiment just directly entering a receiving antenna thereof will not cause errors in detection because the frequency of incoming radio waves does not change. However, in a radio wave sensor that detects the movement of an object by receiving radio waves reflected by the object, part of radio waves from a transmitting antenna directly entering a receiving antenna thereof could cause errors in detection.

Therefore, in the present embodiment, the housing 5 is provided with the first protrusion 511 that faces the transmitting antenna 2, and the second protrusion 512 that faces the receiving antenna 3, in order to strengthen the electric field coupling between the transmitting antenna 2 and the housing 5 as well as the electric field coupling between the receiving antenna 3 and the housing 5. Hereinafter, the radio wave sensor 1 will be explained in detail.

The first protrusion 511 protrudes from a region, facing the transmitting antenna 2, of the bottom board 51 in the housing 5 towards the transmitting antenna 2. The second protrusion 512 protrudes from a region, facing the receiving antenna 3, of the bottom board 51 towards the receiving antenna 3. Each of protrusion distances of the first and second protrusions 511 and 512 is H1 (see FIG. 2). That is, in the embodiment, the protrusion distance of the first protrusion 511 equals the protrusion distance of the second protrusion 512.

In the embodiment, the first protrusion 511 and part of the bottom board 51 that is joined to the first protrusion 511 constitute a first part 6. In the embodiment, the second protrusion 512 and part of the bottom board 51 that is joined to the second protrusion 512 constitute a second part 7. In the embodiment, part of the bottom board 51 between the first and second parts 6 and 7 forms a third part 8. Therefore, in the embodiment, a depression 513 is formed between the first and second parts 6 and 7 as shown in FIG. 2.

The first protrusion 511 is composed of a dielectric that is the same as the housing 5. The first protrusion 511 protrudes towards the transmitting antenna 2, and can thereby strengthen the electric field coupling between the transmitting antenna 2 and the housing 5 as compared with cases where the first protrusion 511 is not provided. The second protrusion 512 is also composed of a dielectric that is the same as the housing 5. The second protrusion 512 protrudes towards the receiving antenna 3, and can thereby strengthen the electric field coupling between the receiving antenna 3 and the housing 5 as compared with cases where the second protrusion 512 is not provided. As a result, beams r11 as larger part of beams (radio waves in different directions) of the radio waves r1 from the transmitting antenna 2 can be directed forward (towards first protrusion 511). Strengthening respective electric field coupling between the housing 5 and each of the transmitting and receiving antennae 2 and 3 enables suppressing the electric field coupling between the transmitting and receiving antennae 2 and 3 as compared with cases where the first and second protrusions 511 and 512 are not provided. It is consequently possible to reduce the radio waves r1 directly entering the receiving antenna 3 from the transmitting antenna 2. The radio wave sensor 1 according to the embodiment therefore enables suppressing the occurrence of errors in detection.

Here, the third part 8 is located between the first and second parts 6 and 7 and, in the embodiment, part of the bottom board 51 of the housing 5 between the first and second protrusions 511 and 512. In the embodiment, preferably, each thickness t1 of the first and second parts 6 and 7 equals a sum of thickness t2 of the third part 8 and a protrusion distance H1 of a first or second protrusion 511 or 512, where t2 is the thickness of the third part 8 in the fore-and-aft direction (up-and-down direction in FIG. 2). That is, in the embodiment, each thickness t1 of the first and second parts 6 and 7 is thicker than the thickness t2 of the third part 8.

Note that each protrusion distance H1 of the first and second protrusions 511 and 512 is preferably greater than or equal to a quarter the length of λ1 and less than λ1, where λ1 is a wavelength of radio waves r1 in the housing 5. The wavelength λ1 of the radio waves r1 is given by Expression 1 below:

$$\lambda 1 = \frac{c1}{f1 \times \sqrt{\varepsilon 1}},$$

where f1 is a frequency of the radio waves r1, c1 is a speed of the radio waves r1, and ε1 is a relative dielectric constant of ABS resin for forming the housing 5.

In the embodiment, the speed c1 of the radio waves r1 is $3 \times 10^8$ [m/s] and the frequency f1 of the radio waves r1 is 24

[GHz], and therefore the wavelength λ1 of the radio waves r1 is about 7 [mm] when the relative dielectric constant e1 of the ABS resin is 3.

It is therefore preferable that each of the protrusion distances H1 of the first and second protrusions 511 and 512 be greater than or equal to 1.75 (=λ1/4) [mm] and less than 7 [mm]. More preferably, each of the protrusion distances H1 of the first and second protrusions 511 and 512 is about 4.0+/−0.5 [mm].

In addition, the thickness t2 of the bottom board 51 in the housing 5, i.e., the thickness t2 of the third part 8 in the bottom board 51 is preferably set to satisfy Expression 2 below:

$$L2 = \frac{t2}{\cos\theta 1} = n \times \frac{\lambda 1}{2},$$

where L2 is a path length in the third part 8 through which beams r12, towards the central part of the third part 8 in the bottom board 51 of the housing 5, of beams of the radio waves r1 from the transmitting antenna 2 pass, θ1 is an incidence angle of beams r12 onto the third part 8, and n is a positive integer. Note that the central part of the third part 8 is a neighboring region including an intersection P1 of a central line PL1 of the third part 8 in a thickness direction of the third part 8 (up-down direction in FIG. 2) with a back surface of the third part 8 (surface that faces transmitting and receiving antennae 2 and 3).

According to Expression 2, it is preferable that the thickness t2 of the third part 8 be set so that the path length L2 of the beams r12 is integer times the length of λ1/2. In the embodiment, since the wavelength λ1 of radio waves r1 in the housing 5 is 7 [mm], the thickness t2 of the third part 8 is preferably set so that the path length L2 of the beams r12 is 3.5 n [mm]. It is accordingly possible to reduce beams (reflected waves) r13 to enter the receiving antenna 3 after reflection on the third part 8 because at least part of the beams r12, towards the central part of the third part 8, of the beams of the radio waves r1 from the transmitting antenna 2 passes through the third part 8. It is consequently possible to suppress the occurrence of errors in detection caused by the reflection of the radio waves r1 on the third part 8.

The first part 6 is preferably provided so as to prohibit the beams r12, towards the central part of the third part 8, of the beams of radio waves r1 from the transmitting antenna 2 from passing through the first part 6. In other words, the first protrusion 511 as part of the first part 6 is preferably provided so as not to interrupt respective propagation paths of the beams r12. In this case, the first protrusion 511 requires that the protrusion distance H1 thereof from the bottom board 51, a width dimension thereof (dimension in left-and-right direction in FIG. 2) and a location thereof relative to the bottom board 51 are determined so as not to interrupt the beams r12. There is accordingly an advantage that the propagation directions of the beams r12 are not bent by the first protrusion 511 because the beams r12 towards the central part of the third part 8 do not pass through the first protrusion 511.

Hereinafter, a modified example of the present embodiment will be explained.

Figure 5:
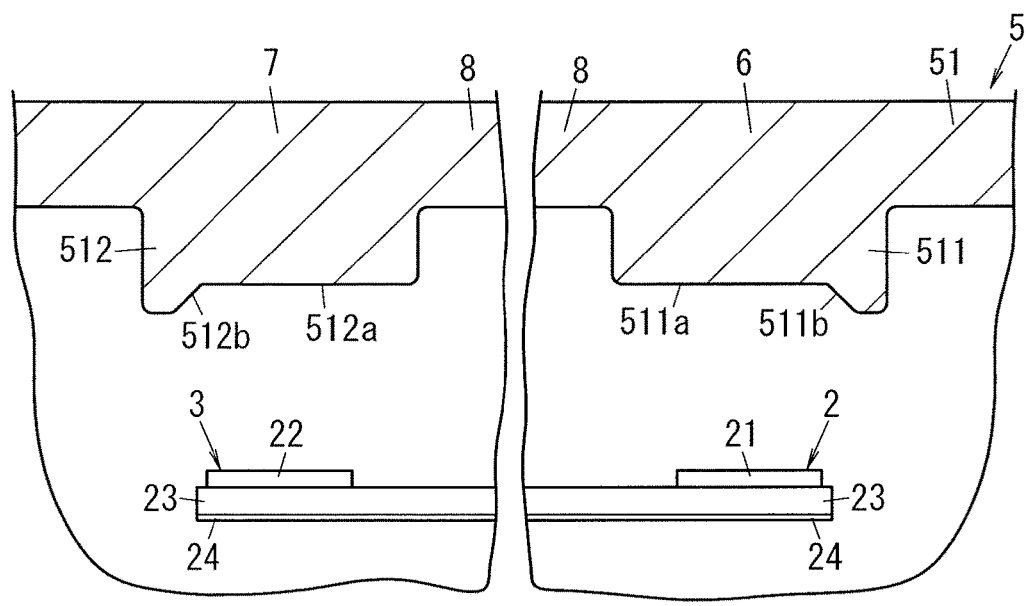
FIG. 5 is a sectional view of part of a radio wave sensor in a modified example in accordance with the embodiment of the present enclosure.

In the abovementioned embodiment, an end surface of the first protrusion 511 is a flat surface, but may be composed of a flat surface 511a and an inclined surface 511b as shown in FIG. 5. The flat surface 511a is parallel to a surface of the radiation element 21 (upper surface in FIG. 5) as part of the transmitting antenna 2. The inclined surface 511b inclines diagonally backward from a right edge of the flat surface 511a. In other words, the inclined surface 511b inclines relative to the flat surface 511a in a direction apart from the flat surface 511a (outward). That is, an inclination angle between the flat surface 511a and the inclined surface 511b is an obtuse angle. Beams, to enter the inclined surface 511b, of the beams of the radio waves r1 from the transmitting antenna 2 are refracted outward (rightward in FIG. 5) when passing through the inclined surface 511b. That is, providing the end of the first protrusion 511 with the inclined surface 511b enables expanding the directivity of the transmitting antenna 3, thereby expanding the detection area of an object.

Note that an end of the second protrusion 512 may be provided with an inclined surface (not illustrated). In this case, preferably, the inclined surface 511b of the first protrusion 511 is provided on an opposite side of the flat surface 511a from the second protrusion 512, while the inclined surface of the second protrusion 512 is provided on an opposite side of the flat surface of the second protrusion 512 from the first protrusion 511. In other words, the inclined surface 511b of the first protrusion 511 and the inclined surface of the second protrusion 512 are preferably provided on outsides in a direction in which the first and second protrusions 511 and 512 are arranged side by side.

In the abovementioned embodiment, the bottom board (base) 51 is integrally formed with the first and second protrusions 511 and 512, but may be individually provided with the first and second protrusions 511 and 512. Note that each of the first and second protrusions 511 and 512 needs to be composed of a dielectric.

In the abovementioned embodiment, the first and second protrusions 511 and 512 protrude from the bottom board 51, and thereby each thickness t1 of the first part 6 including the first protrusion 511 and the second part 7 including the second protrusion 512 is made thicker than the thickness t2 of the third part 8. In contrast, a depression (see depression 513 in FIG. 2) is provided in part of the bottom board 51 facing a region between the transmitting and receiving antennae 2 and 3, and thereby each thickness of the first part 6 facing the transmitting antenna 2 and the second part 7 facing the receiving antenna 3 may be made thicker than the thickness of the third part 8.

In the abovementioned embodiment, the protrusion distance of the first protrusion 511 equals the protrusion distance of the second protrusion 512, but may be different from the protrusion distance of the second protrusion 512.

In the abovementioned embodiment, the dielectric forming the housing 5 is made of ABS resin, but no limited to this. The dielectric may be made of different synthetic resin or material other than synthetic resin as long as the relative dielectric constant thereof is about 3 like the ABS resin.

In the abovementioned embodiment, the cross-sectional areas of the first and second protrusions 511 and 512 are larger than the cross-sectional areas of the radiation elements 21 and 22 of the transmitting and receiving antennae 2 and 3, respectively, but the present embodiment is not limited to this. For example, the cross-sectional areas of the radiation elements 21 and 22 may be larger than the cross-sectional areas of the first and second protrusions 511 and 512, or may be equal thereto.

The radiation elements 21 and 22 are square in cross section, but not limited to this. Examples thereof may further include circular and polygonal. The first and second protrusions 511 and 512 are rectangular in cross section, but not limited to this. Examples thereof may further include circular and polygonal. In other words, as long as the radiation elements 21 and 22 face the first and second protrusions 511 and 512, respectively, cross sections and sizes of the radiation elements 21 and 22 and the first and second protrusions 511 and 512 may be arbitrarily selected.

In the embodiment, the front surface of the bottom board 51 of the housing 5 that accommodates the transmitting and receiving antennae 2 and 3 (opposite surface to transmitting and receiving antennae 2 and 3) is a flat surface, but not limited to this. Examples thereof may further include a curved surface and the like.

As can clearly be seen from the embodiment stated above, a radio wave sensor 1 according to a first aspect includes a transmitting antenna 2, a receiving antenna 3 and a housing 5. The transmitting antenna 2 is configured to radiate radio waves r1. The receiving antenna 3 is configured to receive incoming radio waves r1 (e.g., radio waves (reflected by external object) from transmitting antenna 2). The housing 5 is composed of a dielectric (dielectric material) and faces the transmitting and receiving antennae (antennas) 2 and 3. The housing 5 has a first part 6 that faces the transmitting antenna 2, a second part 7 that faces the receiving antenna 3, and a third part 8 between the first and second parts 6 and 7. In a facing direction in which a base (bottom board 51) of the housing 5 faces the transmitting and receiving antennae 2 and 3, respective thickness t1 of the first and second parts 6 and 7 are thicker than thickness t2 of the third part 8.

With the first aspect, the respective thickness t1 of the first and second parts 6 and 7 in the facing direction are thicker than the thickness t2 of the third part 8. It is therefore possible to strengthen the electric field coupling between the transmitting antenna 2 and the first part 6 as well as the electric field coupling between the receiving antenna 3 and the second part 7. As a result, larger part of the radio waves r1 from the transmitting antenna 2 can be directed towards the first part 6. It is also possible to suppress the electric field coupling between the transmitting and receiving antennae 2 and 3 because the electric field coupling between the transmitting antenna 2 and the first part 6 as well as the electric field coupling between the receiving antenna 3 and the second part 7 are strengthened. As a result, radio waves r1 to directly enter the receiving antenna 3 can be reduced. The first aspect therefore enables suppressing the occurrence of errors in detection.

In the radio wave sensor 1 according to the first aspect, as a second aspect, the base (bottom board 51) includes the third part 8 and faces the transmitting and receiving antennae 2 and 3. The first part 6 includes a first protrusion 511 that protrudes from the base (bottom board 51) towards the transmitting antenna 2. The second part 7 includes a second protrusion 512 that protrudes from the base (bottom board 51) towards the receiving antenna 3. The third part 8 is part of the base (bottom board 51) between the first and second protrusions 511 and 512.

With the second aspect, only the base as part of the housing 5 being provided with the first and second protrusions 511 and 512 enables suppressing the occurrence of errors in detection by the simple configuration. Note that this configuration is included as an option.

In the radio wave sensor 1 according to the second aspect, as a third aspect, a protrusion distance H1 of the first protrusion 511 in the facing direction is greater than or equal to a quarter of a wavelength of the radio waves r1 in the housing 5 ($\lambda 1/4$) and less than the wavelength (one wavelength) $\lambda 1$.

With the third aspect, it is possible to strengthen the electric field coupling between the transmitting antenna 2 and the first part 6 as compared with cases where the protrusion distance H1 of the first protrusion 511 is not in the abovementioned range. Note that this configuration is not indispensable for the radio wave sensor 1. As long as the first protrusion 511 protrudes from the base towards the transmitting antenna 2, the protrusion distance H1 of the first protrusion 511 need not be in the range.

In a radio wave sensor 1 according to any of the first to third aspects, as a fourth aspect, the thickness t2 of the third part 8 is set so that a path length L2 in the third part 8 through which at least part of radio waves r12, towards a central part of the third part 8, of the radio waves r1 from the transmitting antenna 2 passes is integer times one half of a wavelength of the radio waves r1 ($\lambda 1/2$) in the housing 5.

With the fourth aspect, at least part of radio waves (beams) r12, towards the central part of the third part 8, of the radio waves (beams) r1 from the transmitting antenna 2 passes through the third part 8. The fourth aspect therefore enables reducing radio waves (beams) r13 to enter the receiving antenna 3 after reflection on the third part 8. It is accordingly possible to suppress the occurrence of errors in detection caused by the radio waves r1 (beams r13) after the reflection on the third part 8. Note that this configuration is included as an option.

In a radio wave sensor 1 according to any of the first to fourth aspects, as a fifth aspect, the first part 6 is provided so as to prohibit radio waves (beams) r12, towards a central part of the third part 8, of the radio waves (beams) r1 from the transmitting antenna 2 from passing through the first part 6.

The fifth aspect has an advantage that prevents the propagation direction of the radio waves r1 from being bent by the first part 6 because the radio waves (beams) r12, towards the central part of the third part 8, of the radio waves (beams) r1 from the transmitting antenna 2 do not pass through the first part 6. Note that this configuration is included as an option.

In a radio wave sensor 1 according to the second aspect, as a sixth aspect, the first protrusion 511 has a first incidence surface. The first incidence surface includes a first flat surface (flat surface 511a) parallel to a surface of the transmitting antenna 2, and a first inclined surface (inclined surface 511b) that inclines relative to the first flat surface in a direction apart from the first flat surface. The second protrusion 512 has a second incidence surface. The second incidence surface includes a second flat surface (flat surface 512a) parallel to a surface of the receiving antenna 3, and a second inclined surface (inclined surface 512b) that inclines relative to the second flat surface in a direction apart from the second flat surface.

The sixth aspect enables expanding respective directivity of the transmitting and receiving antennae 2 and 3 outward.

In a radio wave sensor 1 according to the first aspect, as a seventh aspect, the third part 8 has a depression (see depression 513 in FIG. 2) that is set further back than respective flat surfaces 511a and 512a of the first and second protrusions 511 and 512.

The seventh aspect can have an outside dimension that is made smaller in the facing direction as compared with cases where the first and second parts 6 and 7 are provided with respective protrusions.

In a radio wave sensor 1 according to the second aspect, as a eighth aspect, a protrusion distance of the first protrusion 511 is different from a protrusion distance of the second protrusion 512.

The eighth aspect enables separately adjusting transmitting performance and receiving performance.

In a radio wave sensor 1 according to the second aspect, as a ninth aspect, the transmitting and receiving antennae 2 and 3 have respective radiation elements 21 and 22. In a plane perpendicular to the facing direction, each cross-sectional area of the first and second protrusions 511 and 512 is larger than each cross-sectional area of the radiation elements 21 and 22.

The eighth aspect enables improving both transmitting performance and receiving performance.

A radio wave sensor 1 according to a tenth aspect includes a transmitting antenna 2, a receiving antenna 3 and a housing 5. The transmitting antenna 2 includes a flat transmitting element (radiation element 21), and is configured to radiate radio waves from a transmitting surface 21a (see FIG. 2) of the flat transmitting element. The receiving antenna 3 includes a flat receiving element (radiation element 22), and is configured to receive incoming radio waves onto a receiving surface 22a of the flat receiving element. The housing 5 is composed of a dielectric (dielectric material). The housing 5 includes a flat front board (bottom board 51) provided forward of the transmitting and receiving surfaces 21a and 22a, and accommodates the transmitting and receiving antennae (antennas) 2 and 3 with the transmitting and receiving surfaces 21a and 22a facing an inner surface 51a of the flat front board. The flat front board has a first part 6 and a second part 7 that face the transmitting surface 21a and the receiving surface 22a, respectively, and a third part 8 between the first and second parts 6 and 7. In a facing direction in which the flat front board (bottom board 51) faces the transmitting and receiving antennae 2 and 3, respective thickness t1 of the first and second parts 6 and 7 are thicker than thickness t2 of the third part 8.

The tenth aspect enables suppressing the occurrence of errors in detection.

A luminaire according to an aspect includes a radio wave sensor 1 of any of the first to tenth aspects, and a luminaire body 12 that retains the radio wave sensor 1.

With this aspect, it is possible to suppress the occurrence of errors in detection with the abovementioned radio wave sensor 1.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A radio wave sensor, comprising
a transmitting antenna configured to radiate radio waves,
a receiving antenna configured to receive incoming radio waves, and
a housing that is composed of dielectric material and faces the transmitting and receiving antennas,
the housing having a first part that faces the transmitting antenna, a second part that faces the receiving antenna, and a third part between the first and second parts, and
in a facing direction in which a base of the housing faces the transmitting and receiving antennas, respective thickness of the first and second parts being thicker than thickness of the third part.

2. The radio wave sensor of claim 1, wherein:
the base includes the third part and faces the transmitting and receiving antennas;
the first part includes a first protrusion that protrudes from the base towards the transmitting antenna;
the second part includes a second protrusion that protrudes from the base towards the receiving antenna; and
the third part is part of the base between the first and second protrusions.

3. The radio wave sensor of claim 2, wherein a protrusion distance of the first protrusion in the facing direction is greater than or equal to a quarter of a wavelength of the radio waves in the housing and less than the wavelength.

4. The radio wave sensor of claim 1, wherein the thickness of the third part is set so that a path length in the third part through which at least part of radio waves, towards a central part of the third part, of the radio waves from the transmitting antenna passes is integer times one half of a wavelength of the radio waves in the housing.

5. The radio wave sensor of claim 2, wherein the thickness of the third part is set so that a path length in the third part through which at least part of radio waves, towards a central part of the third part, of the radio waves from the transmitting antenna passes is integer times one half of a wavelength of the radio waves in the housing.

6. The radio wave sensor of claim 1, wherein the first part is provided so as to prohibit radio waves, towards a central part of the third part, of the radio waves from the transmitting antenna from passing through the first part.

7. The radio wave sensor of claim 2, wherein the first part is provided so as to prohibit radio waves, towards a central part of the third part, of the radio waves from the transmitting antenna from passing through the first part.

8. The radio wave sensor of claim 2, wherein
the first protrusion has a first incidence surface that includes a first flat surface parallel to a surface of the transmitting antenna, and a first inclined surface that inclines relative to the first flat surface in a direction apart from the first flat surface, and
the second protrusion has a second incidence surface that includes a second flat surface parallel to a surface of the receiving antenna, and a second inclined surface that inclines relative to the second flat surface in a direction apart from the second flat surface.

9. The radio wave sensor of claim 1, wherein the third part has a depression that is set further back than respective flat surfaces of the first and second protrusions.

10. The radio wave sensor of claim 2, wherein a protrusion distance of the first protrusion is different from a protrusion distance of the second protrusion.

11. The radio wave sensor of claim 2, wherein
the transmitting and receiving antennas have respective radiation elements, and
in a plane perpendicular to the facing direction, each cross-sectional area of the first and second protrusions is larger than each cross-sectional area of the radiation elements.

12. A radio wave sensor, comprising
a transmitting antenna that includes a flat transmitting element, and is configured to radiate radio waves from a transmitting surface of the flat transmitting element,
a receiving antenna that includes a flat receiving element, and is configured to receive incoming radio waves onto a receiving surface of the flat receiving element, and
a housing that is composed of dielectric material,
the housing including a flat front board provided forward of the transmitting and receiving surfaces, and accommodating the transmitting and receiving antennas with the transmitting and receiving surfaces facing an inner surface of the flat front board, the flat front board having a first part and a second part that face the transmitting surface and the receiving surface, respectively, and a third part between the first and second parts, and in a facing direction in which the flat front board faces the transmitting and receiving antennas, respective thickness of the first and second parts being thicker than thickness of the third part.

13. A luminaire, comprising
a radio wave sensor of claim 1, and
a luminaire body that retains the radio wave sensor.

14. A luminaire, comprising
the radio wave sensor of claim 12, and
a luminaire body that retains the radio wave sensor and a control device configured to turn a light source on and off according to a detection signal from the radio wave sensor.

* * * * *